United States Patent Office 3,519,681
Patented July 7, 1970

3,519,681
3,7-DIMETHYL-3,7-DIHYDROXY-OCT-1-YNE AND ESTERS THEREOF
Gabriel Saucy, Essex Falls, N.J., assignor, by mesne assignments, to Givaudan Corporation, Clifton, N.J., a corporation of New Jersey
No Drawing. Continuation of application Ser. No. 301,969, Aug. 14, 1963. This application Dec. 8, 1966, Ser. No. 600,019
Claims priority, application Switzerland, Aug. 22, 1962, 9,981/62
Int. Cl. C07c 69/16, 69/78
U.S. Cl. 260—488                    3 Claims

ABSTRACT OF THE DISCLOSURE

Novel 3,7 - dimethyl-octyn - (1) - diol-(3,7) and esters thereof which are useful as odorants in the preparation of perfumes and other scented compositions.

CROSS REFERENCE TO RELATED APPLICATIONS

This application is a continuation application of Ser. No. 301,969, Saucy, filed Aug. 14, 1963, now abandoned.

The present invention relates, in general, to novel compounds and to processes for producing same. More particularly, the invention relates to a novel diol and to esters thereof, to methods for producing said diol and esters, to methods for converting said diol and esters into 3,7-dimethyl-7-hydroxy-octanal-(1), known as hydroxy citronellal, and to novel intermediates which are produced and used in the conversion steps.

The novel diol and its esters have the general formula:

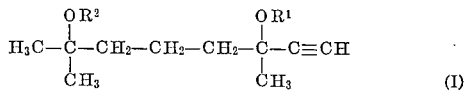

in which the symbol $R^1$ represents a hydrogen atom or an acyl residue of a carboxylic acid; and in which the symbol $R^2$ represents a hydrogen atom or an acyl residue of a carboxylic acid.

The acyl residues, which in Formula I are represented by the symbols $R^1$ and $R^2$, are, for example, radicals derived from lower aliphatic carboxylic acids, radicals derived from lower araliphatic carboxylic acids and radicals derived from monocyclic aromatic carboxylic acids. Thus, encompassed within the scope of the present invention are compounds of Formula I in which $R^1$ and/or $R^2$ are radicals such as formyl, acetyl, propionyl, butyryl, valeroyl, phenacetyl, benzoyl, nitro-benzoyl, anisoyl, etc.

The compounds of Formula I, due to their fine fragrance with fixing properties, are useful as odorants in the preparation of perfumes and other scented compositions. Additionally, the products of this invention are useful as intermediates from which the previously known odorant, hydroxycitronellal, can be prepared.

The compounds of Formula I are readily prepared. In the practice of the invention, a compound having the formula:

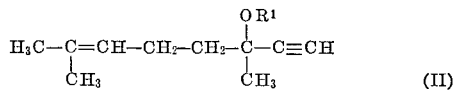

in which the symbol $R^1$ represents a hydrogen atom or an acyl residue of a carboxylic acid is treated with an aqueous mineral acid, following which the reaction product which is thus obtained can, if desired, be converted into a carboxylic acid diester.

In this process, sulfuric acid is preferably employed as the mineral acid reactant. However, other mineral acids, such as phosphoric acid, nitric acid, or a hydrohalic acid, for example, hydrochloric acid or hydrobromic acid, can be used if desired. The acid concentration of the aqueous mineral acid can be varied within rather wide limits. Where, as is the case in the preferred embodiment of the invention, sulfuric acid is employed, it is preferred to use a 10% to 50% sulfuric acid. Preferably, however, 35% sulfuric acid is used.

In carrying out the reaction, one can use a solvent for, or an agent which effects the solution of, the dehydrolinalool compound of Formula II which is used as the starting material. It should be fully understood, however, that the use of such a solvent or such an agent is not necessary. In fact, the hydration reaction of the present invention can advantageously be carried out in a two-phase system. The contact between the aqueous-acidic and the organic phase, which contact is necessary to effectuate the reaction, can be accomplished merely by thoroughly mixing the reactants by, for example, energetically stirring same. The hydration reaction can be carried out at room temperature or at a temperature which is slightly elevated above about room temperature.

When dehydrolinalool is employed as the starting material in this invention the reaction product which is obtained is a diol. More specifically, when dehydrolinalool is used as the starting material, there is obtained a compound having the structure shown in Formula I in which $R^1$ and $R^2$ represent hydrogen. Where, however, an esterified dehydrolinalool compound is used as the starting material, a diol monoester is obtained which has the structure depicted in Formula I where $R^1$ represents an acyl residue and $R^2$ represents hydrogen. The free diol compound, as well as its monoester derivatives, can be converted into a carboxylic acid diester by procedures which are known per se. For example, when the diol is reacted with acetic anhydride, in the presence of a tertiary amine such as dimethylaniline, the corresponding diacetate compound is obtained. Moreover, excellent yields are obtained by esterification of the diol with isopropenyl acetate in the presence of catalytic amounts of p-toluene-sulfonic acid.

It should be fully understood that the symbols $R^1$ and $R^2$ which appear in Formula I can represent the same or different acyl residues. Carboxylic acid diesters which are characterized by the presence of different acyl groups can be produced by treating a diol monoester with an esterifying agent, the acyl radical of which is different from the one which is already present in the molecule.

As indicated heretofore, the compounds of Formula I have a fine fragrance with fixing properties and, as such, are useful as odorants. Additionally, the compounds of this invention are useful as intermediates which can be employed in the production of hydroxycitronellal, a known odorant. The conversion of the compounds of Formula I into hydroxycitronellal can be accomplished in the following manner:

(a) 3,7-dimethyl-octyn-(1)-diol-(3,7) is partially hydrogenated, e.g. in toluene under normal conditions, that is, at room temperature and atmospheric pressure in the presence of a hydrogenation catalyst, preferably with Lindlar catalyst, (Helv. Chim. Acta, 1952, 35, 446) to produce 3,7-dimethyl-octen-(1)-diol-(3,7). This diol can be oxidized to 3,7-dimethyl-7-hydroxy-octen-(2)-al-(1) by procedures which are known per se. For example, by chromic acid oxidation of the diol itself or by reacting a 1-halogeno-3,7-dimethyl-7-hydroxy-octene-(2) which can be obtained from the diol in a manner known per se with an alkali metal salt of a nitronic acid as described in Helv. Chim. Acta, 1957, 40, 1250. The α,β-unsaturated hydroxy-aldehyde, which is thus obtained, can be readily hydrogenated to yield hydroxycitronellal. As but one example of a suitable process, the hydrogenation of the α,β-unsaturated hydroxy aldehyde compound into the desired hydroxy-citronellal can be carried out in ethyl acetate, using palladium on charcoal as the catalyst.

(b) A carboxylic acid diester of Formula I is converted into the corresponding 3,7-dimethyl-7-acyloxy-octen-(2)-al-(1). The conversion can be accomplished by the rearrangement of the acetylenic carboxylic acid diester [3,7-dimethyl-3,7-diacyloxy-octyne-(1)] in the corresponding allenic diester [3,7 - dimethyl - 1,7-diacyloxy-octadiene-(1,2)] in the presence of a suitable rearrangement catalyst, such as silver carbonate, silver acetate, silver trifluoroacetate, silver nitrate, silver fluoroborate, silver perchlorate, copper powder, copper acetate etc., followed by the partial saponification of the rearrangement product to form the corresponding 3,7-dimethyl-7-acyloxy-octen-(2)-al-(1). The rearrangement reaction can be carried out, for instance, in acidic reaction medium according to the method described in Helv. Chim. Acta, 1959, 42, 1945. The rearrangement can also be accomplished in substantially neutral reaction medium, e.g. in the presence of a neutral organic solvent, such as di-lower alkyl ketone, e.g. acetone, a halogenated lower aliphatic or aromatic hydrocarbon, e.g. chloroform, ethylene chloride, chlorobenzene etc. The α,β-unsaturated monoacyloxyaldehyde which is obtained can be convered by catalytic hydrogenation, for example by means of a palladium on charcoal catalyst in methanol, into the 3,7-dimethyl-7-acyloxy-octanal-(1) which, after saponification of the 7-acyloxy group, yields the desired hydroxycitronellal.

For a fuller understanding of the nature and objects of this invention, reference may be had to the following examples which are given merely as further illustrations of the invention and are not to be construed in a limiting sense.

EXAMPLE 1

608 g. of 3,7-dimethyl-octen-(6)-yn-(1)-ol-(3) were charged into a vessel fitted wtih a stirrer and it was stirred vigorously therein, for 6 days at room temperature, with 608 g. of 35% sulfuric acid. The latter acid was obtained by dilution of 350 g. of concentrated sulfuric acid with ice to make 1 liter. A brown emulsion was thus produced. This emulsion was extracted three times with ether, using one liter of ether each time. The extracts were washed with 300 ml. of 3 N caustic soda and 300 ml. of saturated sodium bicarbonate solution, and dried over sodium sulfate. Subsequently, the solvent was removed in a water-jet vacuum at 50° to 60° C. There was obtained 650 g. of crude 3,7- dimethyl-octyn-(1)-diol-(3,7) in the form of a brown colored viscous oil, $n_D^{25}=1.4600$ to 1.4632. This crude compound was purified by fractional high vacuum distillation with the use of a Vigreux column. The purity of the different fractions was determined by thin-layer chromatography. There was obtained: a first fraction of about 50 g. having a boiling point of 75° to 95° C./0.02 mm. $n_D^{25}=1.4470-1.4630$; an intermediate fraction of about 100 g. having a boiling point of 95° to 110° C./0.02 mm. $n_D^{25}=1.4630-1.4660$; and a principal fraction of about 420 g. having a boiling point of 110° C./0.02 mm. $n_D^{25}=1.4660$. The principal fraction contained practically pure diol. The diol content of the intermediate fraction amounted to about 90% to 95%. The first fraction contained a relatively small percentage of diol. The total yield of diol amounted to about 80%.

The analytically pure 3,7-dimethyl-octyn-(1)-diol-(3,7) had a boiling point of 80° C./0.01 mm.

$$n_D^{22}=1.4670$$

$d_4^{20}=0.9648$. The compound gradually solidifies and then shows a melting point of 44° to 46° C.

The diol, produced as described in the foregoing paragraph, was converted into 3,7-dimethyl-7-hydroxy-octanal-(1), that is, into hydroxycitronellal, as follows:

(a) 85 g. of the 3,7-dimethyl-octyn-(1)-diol-(3,7) were dissolved in 425 ml. of absolute toluene and, after the addition thereto of 0.5 g. of Lindlar catalyst and 0.5 ml. of quinoline, hydrogenated at normal conditions, that is, room temperature and atmospheric pressure. The hydrogenation was substantially completed after about one-half mol (12.5 liters) of hydrogen had been taken up. Thereafter the catalyst was removed by filtration and the solvent removed by heating the reaction mixture at a temperature of 60° C. There was obtained 87 g. of viscous 3,7-dimethyl-octen-(1)-diol-(3,7), boiling point at 80° C./0.01 mm; melting point at 44° to 46° C.

(b) 86.2 g. of crude 3,7-dimethyl-octen-(1)-diol-(3,7), produced as described in the preceding paragraph, 80 ml. of benzene, 12.5 ml. of glacial acetic acid and a solution of 100 g. of sodium bichromate in 300 ml. of water were heated in an oil bath at 70° C. to an internal temperature of 65° to 70° C. A solution of 92 g. of concentrated sulfuric acid in 100 ml. of water was added dropwise to the mixture over a period of three hours. During the addition of the sulfuric acid thereto, the mixture was stirred vigorously and maintained at a temperature of from about 65° to 70°. When the addition of the acid was completed, the reaction mixture was stirred for an additional two hours at 70° C. The resulting green suspension was then extracted with ether three times, using 500 ml. of ether each time. The ether extracts were washed first with 100 ml. of saturated ammonium chloride solution, thereafter two times with sodium bicarbonate solution and, finally, once again with ammonium chloride solution. The washed extracts were then dried over sodium sulfate, following which the solvent was removed in a water-jet vacuum at a temperature of 50° C. There was obtained 77 g. of crude 3,7-dimethyl-7-hydroxy - octen - (2)-al-(1); $n_D^{23}=1.473$; U.V.-absorption maximum at 237.5 mμ, $$E_{1cm.}^{1\%}=600 \text{ (59\% yield according to U.V.)}$$

The crude product was purified via the water-soluble bisulphite addition compound.

The analytically pure 3,7-dimethyl-7-hydroxy-octen-(2)-al-(1) which was obtained was a practically colorless viscous oil; $n_D^{23}=1.4856$; $d_4^{20}=0.9604$; U.V.-absorption maximum at 238 mμ, $$E_{1cm.}^{1\%}=915, \epsilon=15,540$$

The aldehyde named in the previous paragraph can be prepared by an alternate method. Such alternate method proceeds as follows: 17.2 g. of crude 3,7-dimethyl-octen-(1)-diol-(3,7), in 25 ml. of absolute ether, were treated over a period of 20 minutes at a temperature of −5° C., while stirring, with a solution of 10 g. of phosphorus tribromide in 25 ml. of absolute ether. Subsequently, the mixture was stirred for an additional period of one hour at room temperature, then cooled to a temperature of −5° C., following which 50 ml. of water were added thereto. Thereafter, the ethereal layer was separated, washed twice with water, dried over sodium sulfate and filtered. The filtrate was subjected to a nitronic acid oxidation process as described in the following paragraph:

To a solution of 7.64 g. of potassium hydroxide in 12.2 ml. of water and 80 ml. of isopropanol, there was added, with stirring and over a period of ten minutes, a mixture of 10.9 g. of 2-nitro-propane and 20 ml. of isopropanol. The resulting solution was stirred at room temperature for a period of about one and one-half hours and thereafter it was mixed with a filtrate produced as described in the preceding paragraph. After evaporation of the ether, the reaction solution was stirred overnight at room temperature, then diluted with water and extracted three times, using 300 ml. of a mixture containing equal parts of petroleum ether and ether each time. The organic layer was washed once with 1 N caustic soda, twice with saturated ammonium chloride solution and then dried over sodium sulfate and evaporated. There was obtained as the residue, 13.2 g. of oil, $n_D^{23}=1.4712$; U.V.-absorption maximum 237.5 m$\mu$, $$E_{1\,cm.}^{1\%}=474$$

Purification of the crude product by means of bisulphate yielded 4.51 g. of an oil, $n_D^{24}=1.4828$ which, according to thin-layer chromatography, contained about 80% 3,7-dimethyl-7-hydroxy-octen-(2) - al - (1) and about 20% citral; U.V.-absorption maximum at 238 m$\mu$, $$E_{1\,cm.}^{1\%}=925$$

Melting point of the 2,4-dinitro-phenylhydrazone: 135° to 137° C.

(c) 17 g. (0.1 mol) of pure 3,7-dimethyl-7-hydroxy-octen-(2)-al-(1), produced by the first of the foregoing alternate procedures, was diluted with 85 ml. of ethyl acetate and, after the addition of 1.7 g. of 5% palladium/charcoal catalyst, it was hydrogenated under normal conditions, that is, room temperature and atmospheric pressure until the uptake of hydrogen had ceased. Over a two day period, 2.37 liters of hydrogen, equivalent to 0.1 mol, had been taken up. The catalyst was filtered off and the solvent removed in a water-jet vacuum. Approximately 10 g. of pure 3,7-dimethyl-7-hydroxy-octanal-(1) (hydroxycitronellal) was obtained by high vacuum distillation.

EXAMPLE 2

To a mixture of 340 g. (2 mol) of 3,7-dimethyl-octyn-(1)-diol-(3,7), produced as described in Example 1, and 726 g. of dimethyl-aniline (6 mol) there was added dropwise, over a two hour period with stirring at a temperature of 50° C., 592 g. (5.8 mol) of acetic anhydride. The solution was stirred for a period of about 20 hours at 50° C. after such addition was completed. Thereafter, the reaction mixture was poured onto 1 kg. of ice. The product was then extracted three times using 2.0 liters of a mixture of ether and petroleum ether each time. The organic phase subsequently was washed in successive operations as follows: four times using 1 liter of 3 N of sulfuric acid each time; two times using 500 ml. of saturated sodium bicarbonate solution each time; and two times using 500 ml. of water each time. After drying over sodium sulfate, the solvent was removed in a water-jet vacuum at a temperature of 50° C. There was obtained, as the residue, 510 g. (95% of theory) 3,7-diacetoxy-3,7-dimethyl-octyne-(1), $n_D^{24}=1.4430-1.4440$, which, by thin layer chromatography proved to be practically pure. By fractional distillation, and after a forerun of 100 g., there was obtained about 400 g. of pure diacetate. The analytically pure compound had the following properties boiling point of 80° to 83° C./0.05 mm.; $n_D^{22}=1.4450$; $d_4^{20}=0.9965$.

The diacetate compound obtained as described in the preceding paragraph can be prepared also in the following manner: 17 g. of 3,7-dimethyl-octyn-(1)-diol-(3,7) were heated reflux temperature for three hours with 30 g. of freshly distilled isopropenyl acetate, after the addition of 50 mg. of para-toluene-sulfonic acid. At the end of the three hour period, the reaction solution was diluted with petroleum ether and, in successive operations, washed three times, using water, then sodium bicarbonate solution and finally water. The reaction solution was subsequently dried over sodium sulfate and solvent removed in a water-jet vacuum at a temperature of 50° C. There was obtained, as a residue, 25 g. of the crude diacetate, $n_D^{25}=1.4458$, which contains no diol and is practically pure according to thin-layer chromatographic analysis.

The diacetate which was produced by the first of the foregoing alternate procedures, was converted into hydroxycitronellal in the following manner:

(a) Rearrangement: 51 g. of 3,7-diacetoxy-3,7-dimethyl-octyne-(1) were diluted with 200 ml. of ethylene chloride and, after the addition of 1 g. of silver trifluoro-acetate, heated at reflux temperature until thin-layer chromatography indicated the substantial absence of the 3,7-diacetate group. Thereafter, the solvent was removed on the rotation-evaporator in a water-jet vacuum at a temperature of 50° C. There was obtained about 54 g. of crude 3,7-dimethyl-1,7-diacetoxy-octadiene-(1,2), as a brown oil, $n_D^{25}=1.4660$ to 1.4680. This compound was used without further processing in the saponification described hereinafter.

(b) A partial saponification was carried out as follows: 215 g. of the crude 3,7-dimethyl-1,7-diacetoxy-octadiene-(1,2), obtained as described in the preceding paragraph was diluted with 200 ml. of methanol and, after the addition of 60 g. of water and 60 g. of soda, stirred for one hour at room temperature. Then, a solution of 180 g. of sodium sulfite in 540 ml. of water was added thereto and the pH of the reaction solution was adjusted to within the range of 8 to 9 by the addition of 6 N sulfuric acid over a period of about thirty minutes. Approximately 260 ml. of 6 N sulfuric acid were used. The mixture was then stirred for a period of about one hour at room temperature and the portions which did not enter into reaction with the sodium sulphite were then isolated as follows: The mixture was extracted three times, in three separating funnels, using 1 liter, 0.5 liter and 0.5 liter of petroleum ether-ether (1:1), washed once with 200 ml. of water and dried over sodium sulfate, following which the solvent was removed in a water-jet vacuum. There was obtained about 25 g. of a brown oil, $n_D^{25}=1.470$ which was rejected. The aqueous phase, which contained the water-soluble bisulfite addition complex of 3,7-dimethyl-7-acetoxy-octen-(2)-al-(1) was returned to the reaction flask, covered over with 0.5 liter of ether and treated with 200 ml. of concentrated caustic soda (33%) with stirring. The mixture was stirred for about two hours at room temperature. The liberated aldehyde was then extracted three times, in three separating funnels, with using 0.5 liter of ether each time. The ether extracts were washed three times with 200 ml. of water, dried over sodium sulfate. Thereafter, the solvent was removed in a water-jet vacuum at a temperature of 50° C. There was obtained about 120 g. of practically pure 3,7-dimethyl-7-acetoxy-octen-(2)-al-(1) in the form of a yellow oil having a faint odor characteristic of citral. An analytically pure product was obtained by high vacuum distillation: boiling point 89° C./0.02 mm.; $n_D^{25}=1.4679$; $d_4^{20}=0.98666$; U.V.-absorption max. at 237.5 m$\mu$, $$E_{1\,cm.}^{1\%}=750$$

$\epsilon=15,900$. On the basis of the vapor phase chromatogram, it was concluded that a mixture of both possible isomers was present. The ratio of cis to trans form amounted to about 28%:72%.

Melting point of the 2,4-dinitro-phenyl hydrazone: 135 to 137° C. (from methanol).

(c) Hydrogenation: 53.1 g. (0.25 mol) of the crude 3,7-dimethyl-7-acetoxy-octen-(2)-al-(1), thus obtained, were diluted with 300 ml. of absolute acetone and, after the addition of 2.5 g. of a 5% palladium/charcoal catalyst, hydrogenated at room temperature and atmospheric pressure. During the hydrogenation, which occurred over a period of about 20 hours, 5.8 liters (about 0.25 mol) of hydrogen was taken up. Thereafter, the catalyst was filtered off, the solvent removed in a water-jet vacuum at 50° C. and the residue (53.5 g., $n_D^{25}=1.4356$) fractionated in a high vacuum. There was obtained about 42 g. of practically pure 3,7-dimethyl-7-acetoxy-octanal-(1) as a colorless oil with a pleasant odor which is similar to that of hydroxycitronellal. The analytically pure aldehyde had the following properties: boiling point 69° C./0.02 mm. $n_D^{25}=1.4362$; $d_4^{20}=0.9512$.

Hydrogenation combined with acetalization: 53.1 g. (0.25 mol) of crude 3,7-dimethyl-7-acetoxy-octen-(2)-al-(1) produced as described in Section (b) of this example, were dilute with 200 ml of absolute methanol and, after the addition of 2.5 g. of a 5% palladium/charcoal catalyst, hydrogenated at room temperature and atmospheric pressure. During the hydrogention, which occurred over a period of about 24 hours, about 6 liters (0.25 mol) of hydrogen was taken up. The catalyst was filtered off then washed with 100 ml. of absolute methanol. In order to effect completion of the acetal formation, 0.5 ml. of concentrated sulfuric acid was added to the filtrate and the mixture was allowed to stand, for about 24 hours at room temperature. This solution was used in the saponification procedure described hereinafter. A small portion of 1,1-dimethoxy-3,7-dimethyl-7-acetoxy-octane was isolated, however, from this solution by extraction with ether. The analytically pure acetal was a colorless oil of slight odor; boiling point 82°/0.01 mm. $n_D^{24}=1.4329$; $d_4^{20}=0.9507$.

(d) Saponification of the 7-acetoxy group: The solution of 1,1-dimethoxy-3,7-dimethyl-7-acetoxy-octane in methanol described in the preceding paragraph was treated with 90 ml. of concentrated caustic soda (33%). The mixture was stirred thoroughly and allowed to stand for two hours at room temperature. Thereafter, the mixture was extracted and, from the ether extract there was obtained about 48 g. of crude acetal, that is, 1,1-dimethoxy-3,7-dimethyl-7-hydroxy-octane, $n_D^{24}=1.441$, which was employed in the hereinafter described acid hydrolysis operation without further purification. The pure acetal was a colorless oil having an odor similar to, but fainter, than that of hydroxycitronellal. Boiling point 71°/0.01 mm.; $n_D^{23}=1.4394$; $d_4^{20}=0.9380$.

(e) Hydrolysis of the acetal grouping: 48 g. of the crude 1,1 - dimethoxy - 3,7 - dimethyl-7-hydroxy-octane, which was produced as described in the preceding paragraph, was dissolved in 96 ml. of absolute acetone. Thereafter 48 ml. of 1 N sulfuric acid was added to the solution which was then allowed to stand for 2 days at room temperature. The mixture was extracted three times, using 500 ml. of ether each time, following which it was washed successively three times with 150 ml. of water, twice using 50 ml. of saturated sodium bicarbonate solution each time and twice using 50 ml. of water each time. The ether solution was subsequently dried with sodium sulfate. The solvent was then removed in a water-jet vacuum at 50° after the addition of 0.3 g. of hydroquinone to serve as a stabilizer. There was obtained 41 g. of crude hydroxycitronellal, that is, 3,7-dimethyl-7-hydroxy-octanal-(1), in the form of a bright yellow oil, $n_D^{23}=1.446$ to 1.448. The product is 80–85% pure on the basis of the vapor phase chromatographic analysis.

Practically pure hydroxycitronellal was obtained after purification via the bisulphite adduct.

EXAMPLE 3

A mixture of 33.4 g. of p-nitro-benzoic acid, 78.8 g. of p-toluenesulfonic acid chloride and 500 ml. of absolute pyridine was stirred for five hours at room temperature. Thereafter, 17 g. of 3,7-dimethyl-octyn-(1)-diol-(3,7), produced as described in Example 1 was added thereto and the mixture was stirred for an additional 20 hour period at room temperature. There was obtained a dark colored solution which was poured into 2 liters of ice-water. Thereupon, the 3,7-bis(p-nitro-benzoyloxy)-3,7-dimethyl-octyne-(1) which had been formed precipitated out. The precipitated product was filtered off under suction and washed three times with water. There was obtained 45 g. of a damp product having a melting point of 122–132° C. This product was recrystallized from acetone-methanol to yield about 40 g. of practically pure bis p-nitro-benzoate compound having a melting point 132° to 135° C. The product is recrystallized once again from benzene and benzene-hexane, whereupon substantially colorless crystals were obtained; melting point 135° to 136°.

EXAMPLE 4

A mixture of 20 g. of 3,7-dimethyl-3-acetoxy-octen-(6)-yne-(1) (dehydrolinalyl acetate), 20 ml. of glacial acetic acid and 20 ml. of 6 N sulfuric acid was shaken for 5 days at room temperature. The crude product (16 g. $n_D^{23}=1.4531$), obtained by extraction with ether, was chromatographed on 320 g. of Alox (activity III). With petroleum ether-benzene (2:1), petroleum ether-benzene (1:1), with benzene alone and with benzene-either (9:1) there were eluted, all together, 9 fractions (300 ml. each), containing total of 4.46 g. (20%), 3,7-dimethyl-3-acetoxy-7-hydroxy-octyne-(1); $n_D^{23}=1.46–1.47$. 1 g. of the monoacetate, purified chromatographically, was converted into the 3 - acetoxy - 3,7 - dimethyl-7-(p-nirto-benzoyl-oxy)-octyne-(1) by the method described in Example 3. Crystallization of the product from ether-hexane yielded colorless needles melting at 84° to 86° C.; U.V.-absorption max. at 258 mµ, $$E_{1\ cm.}^{1\%}=410$$

$\epsilon=14{,}800$.

I claim:
1. Compounds of the formula:

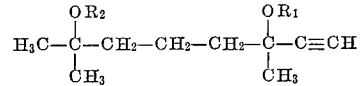

in which $R_1$ is a member selected from the group consisting of hydrogen and hydrocarbon carboxylic acyl and in which $R_2$ is a member selected from the group consisting of hydrogen and hydrocarbon carboxylic acyl.

2. 3,7-dimethyl-octyn-(1)-diol-(3,7).

3. 3,7-diacetoxy-3,7-dimethyl-octyne-(1).

References Cited

UNITED STATES PATENTS 2,797,235   6/1957   Birbiglia et al. _____ 260—489
3,211,780  10/1965   Marbet et al. _____ 260—471

OTHER REFERENCES

Wagner et al., Synthetic Organic Chem., 1953, p. 174.

LORRAINE A. WEINBERGER, Primary Examiner

V. GARNER, Assistant Examiner

U.S. Cl. X.R.

260—471, 476, 489, 491, 602, 615, 635, 473; 252—522